US012747821B2

(12) United States Patent
Nolfi et al.

(10) Patent No.: US 12,747,821 B2
(45) Date of Patent: Sep. 29, 2026

(54) HIGH TEMPERATURE RESISTANT, JACKETED FOREIGN MATERIAL EXCLUSION DEVICE

(71) Applicant: ADVANCED F.M.E. PRODUCTS, INC., Mentor, OH (US)

(72) Inventors: Thomas J. Nolfi, Chardon, OH (US); Chase Penix, Painesville, OH (US)

(73) Assignee: ADVANCED F.M.E. PRODUCTS, INC., Mentor, OH (US)

( * ) Notice: Subject to any disclaimer, the term of this patent is extended or adjusted under 35 U.S.C. 154(b) by 390 days.

(21) Appl. No.: 18/412,829

(22) Filed: Jan. 15, 2024

(65) Prior Publication Data

US 2024/0255093 A1 Aug. 1, 2024

Related U.S. Application Data

(60) Provisional application No. 63/441,322, filed on Jan. 26, 2023.

(51) Int. Cl.
*F16L 55/24* (2006.01)
*F16L 55/40* (2006.01)

(52) U.S. Cl.
CPC ............... *F16L 55/24* (2013.01); *F16L 55/40* (2013.01)

(58) Field of Classification Search
CPC ................................. F16L 55/24; F16L 55/40
USPC ........................................................... 138/89
See application file for complete search history.

(56) References Cited

U.S. PATENT DOCUMENTS 4,615,460 A * 10/1986 Buccellato ................ B64F 5/30 220/DIG. 19
5,143,321 A * 9/1992 Jackson .................. B64F 1/005 60/39.092
6,506,014 B1 1/2003 Nolfi et al.
6,824,356 B2 11/2004 Nolfi et al.
7,533,698 B2 5/2009 Nolfi et al.
8,977,203 B2 3/2015 Nolfi et al.
9,133,727 B2 9/2015 Nolfi et al.
9,476,534 B2 10/2016 Nolfi et al.
9,550,581 B2 * 1/2017 Loureiro ................ B64D 29/00
9,938,859 B2 4/2018 Nolfi et al.
10,436,111 B2 10/2019 Nolfi et al.
11,333,286 B2 5/2022 Nolfi et al.
11,867,336 B2 1/2024 Nolfi et al.
2010/0326556 A1 * 12/2010 Martus ................... B65D 59/02 138/89
2014/0261831 A1 * 9/2014 Nolfi ..................... F16L 55/105 138/89

* cited by examiner

*Primary Examiner* — David R Deal
(74) *Attorney, Agent, or Firm* — Hudak, Shunk & Farine Co. LPA

(57) ABSTRACT

Foreign material exclusion devices that are particularly suited for use in high temperature environments, but can also be used at ambient room temperature or below as well. The devices include a shaped resilient body comprising heat-resistant foam fully encased in a heat resistant jacket.

19 Claims, 2 Drawing Sheets

HIGH TEMPERATURE RESISTANT, JACKETED FOREIGN MATERIAL EXCLUSION DEVICE

FIELD OF THE INVENTION

The present invention relates to foreign material exclusion devices that are particularly suited for use in high temperature environments, but can also be used at ambient room temperature or below as well. The devices include a shaped resilient body comprising heat-resistant foam fully encased in a heat resistant jacket.

BACKGROUND OF THE INVENTION

During assembly or maintenance of various assemblies or constructions in numerous industries, it is desirable to prevent the introduction of debris into one or more areas to prevent damage to various objects. Foreign material exclusion is of particular concern in the field of power generation and supply, whether nuclear, hydro or fossil fueled in order to prevent or reduce power shortages and outages, as well as to increase nuclear safety.

While undergoing maintenance or assembly, small parts, screws, bolts, or other foreign objects can fall into crevices of a construction. If not prevented, retrieved or noticed, such parts can have the potential to destroy or at least damage a particular unit and produce varying consequences, potentially catastrophic.

In order to provide foreign material exclusion, various devices have been proposed, see for example U.S. Pat. Nos. 6,506,014; 6,824,356; 7,533,698; 8,967,203; 9,133,727; 9,476,534; 9,938,859; 10,436,111; 11,333,286 and 11,867,336.

SUMMARY OF THE INVENTION

While the prior art described above is suitable for its intended purposes, the art still needs versatile foreign material exclusion devices able to withstand relatively high temperature environments, as well as near room temperature conditions.

Still further, the art needs high temperature resistant foreign material exclusion devices including a resilient foam body that is permanently encased in a jacket, the latter preventing debris from contacting the foam therewithin.

The foreign material exclusion devices disclosed herein meet the needs described above, as well as others, as apparent from the description set forth herein. The devices are adapted to be positioned within a tube, pipe or other cavity to temporarily seal off one side from another to prevent construction or other debris from entering a sensitive side of the tube, pipe or cavity. The devices comprise a resilient body comprising heat-resistant foam located within a flexible cover or jacket that can be fitted into the tube or pipe in a semi-compressed state and, upon positioning thereof, expanded to form a snug perimeter fit with the tube, pipe or cavity.

In one aspect of the invention a high temperature resistant foreign material exclusion device is disclosed, including a body comprising a resilient foam, wherein the body is compressible and re-expandable in a direction parallel to at least one of a first face surface and a second face surface of the body, wherein a sidewall extends between the first face surface and the second face surface, wherein the body has a maximum continuous use temperature of at least 300° F. (149° C.); a jacket that surrounds and fully encases the body within the jacket such that any debris contacting the foreign exclusion material device is not able to contact the body, wherein the jacket is flexible and conformable to a shape of the body, wherein the jacket comprises a flame resistant material, wherein the jacket has a maximum continuous use temperature of at least 300° F. (149° C.); and a handle directly connected to the jacket adjacent one of the faces of the body for manipulating the device; and optionally a device identifier element inseparably affixed to the jacket.

For the avoidance of doubt, it is understood that while various embodiments of the invention are described individually, it should be clear that two or more embodiments can, and often times are present in a single device according to the present invention.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
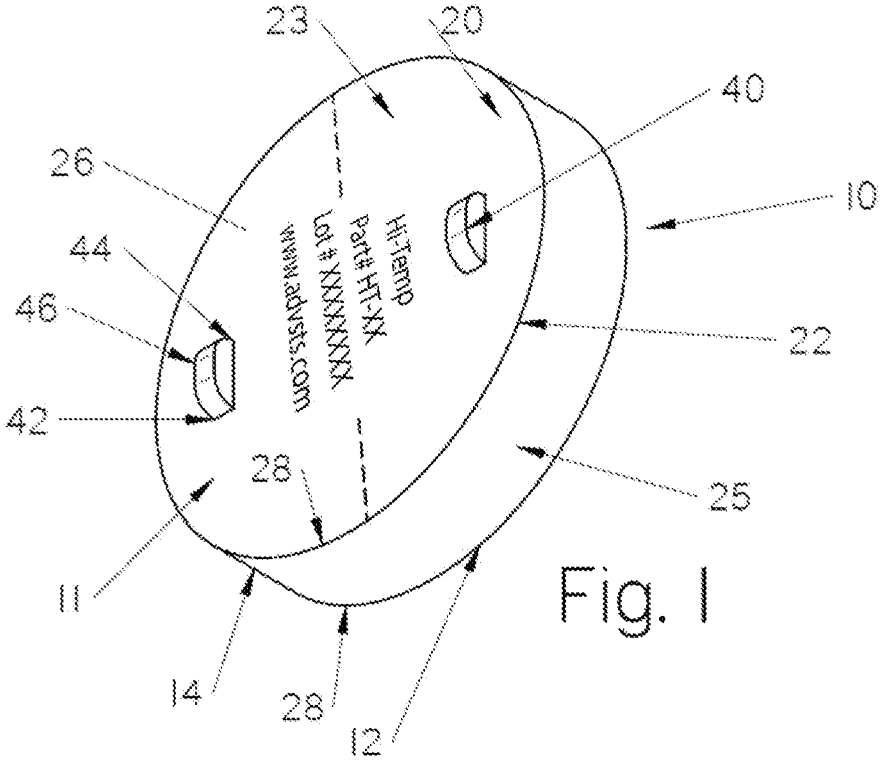
FIG. 1 illustrates a perspective view of one embodiment of a high temperature resistant, jacketed foreign material exclusion device.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The foreign material exclusion devices of the present invention are especially adapted to be temporarily positioned in a construction, for example, but not limited to, a tube, a pipe, an orifice, a cavity, or the like to seal off a potentially sensitive area of the construction from foreign materials, debris or the like. As an example, it is desirable to protect a construction such as a turbine in a power plant from debris as the turbine can be catastrophically damaged by loose parts, metal shavings or the like. Foreign material exclusion devices can be utilized during construction, assembly, repair or the like of a portion of a product such as, but not limited to, a turbine, a pump, a fan, a housing, a boiler tube, an engine or any other device with limited access openings and/or cavities.

Referring now to the drawings, wherein like parts or components are represented by like or identical reference numbers throughout the several views, a high temperature resistant, jacketed foreign material exclusion device 10 is illustrated. FIG. 1 illustrates one embodiment of device 10 in a perspective view. Device 10 includes a jacket 20 that surrounds and fully encases a foam body 30, see FIG. 2, within the jacket 20 so that any debris contacting the foreign material exclusion device when installed in a construction is not able to contact the body 30 located inside the jacket. One or more handles 40 are directly connected to the jacket on the surface of the jacket adjacent one of the faces of the body for manipulating the device, such as to facilitating placing and/or removing the device from a construction.

Body

Figure 2:
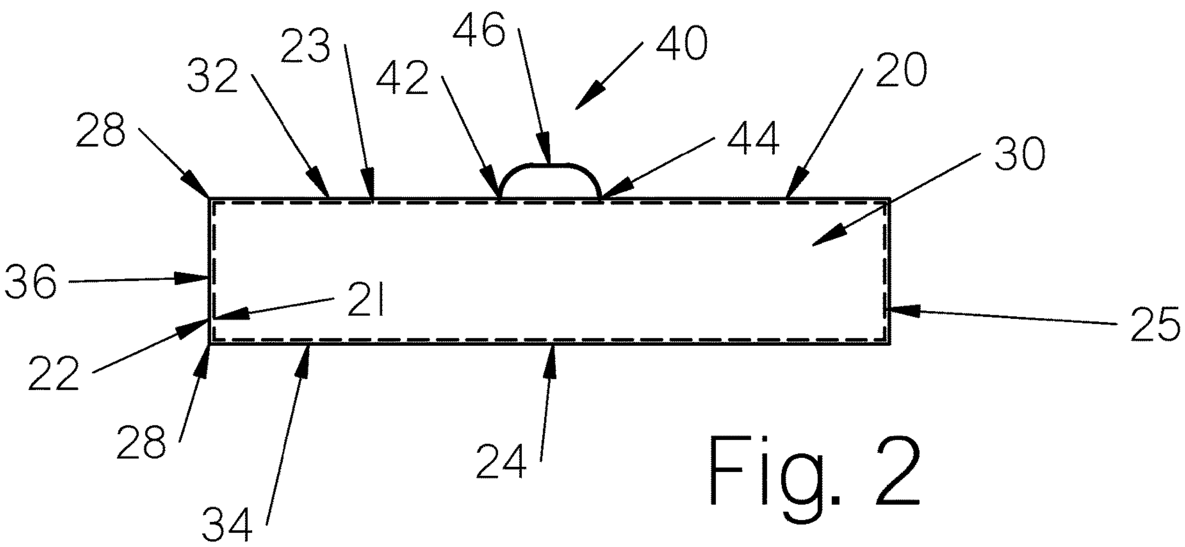
FIG. 2 is a cross-sectional side view of one embodiment of a device of the present invention.

Body 30, as illustrated in FIG. 2 has a first or upper face surface 32, a second or lower face surface 34 and one or more side walls 36 located therebetween. When the device 10 and body 30 are cylindrical in shape, only one, continuous side wall 36 is present.

As the thickness of conformable jacket 20 is relatively small compared to the thickness of body 30 between face surfaces 32 and 34, the body provides the bulk of material adapted to hold the device 10 in place within a desired location of a construction. The thickness of the body can vary depending on factors such as the width or length of a body generally in the planar direction or parallel to the plane of surfaces 32 and 34, the type of foam utilized to create body 30, and the shape of body 30. That said, the thickness of body 30 between face surfaces 32 and 34 ranges from about 5 to about 15 cm, desirably from about 10 to about 15 cm, and preferably from about 10 to about 12 cm in preferred embodiments.

In preferred embodiments, the face surfaces 32 and 34 are planar, with first face 32 being parallel to second face 34. Having a planar surface enables the user of the device to readily identify any debris on the outer surface of the jacket 20 which can be extracted prior to removal of the device 10 from a construction such as a tube, pipe, or other cavity. However, some embodiments it may be desirable to utilize bodies having face surfaces that are not planar.

In a critical aspect of the present invention, the body 30 of device 10 comprises a high temperature stable, resilient foam. As utilized herein, the term "resilient" is defined as the ability to be compressed, in order to facilitate insertion of the device into a construction, and re-expandable after a compressive force is removed, so that the device contacts the inner perimeter wall of the construction in order to keep the foreign material exclusion device in place and held within the construction thereby keeping foreign material from traveling from one side of the construction and device 10 to the other side of the construction and device.

In a preferred embodiment, the body comprises open cell polyimide foam. Open-cell foams allow for the passage of gases through body 30 of device 10 but provide enhanced filtration of dust particles which may penetrate jacket 20. The polymeric polyimide foam comprises aromatic rings coupled by imide linkages. The polyimide foams of the present invention are thermally stable in inert atmospheres at temperatures up to at least 260° C. The polyimide foam derived from polyimide resin has excellent long term thermal stability and is therefore suitable for a variety of high temperature applications in foreign material exclusion devices. The foam also provides for resistance to heat flow that makes it ideal as a thermal insulator thereby reducing heat transfer from one side of the device to the other. The foam has a relatively low density which is ideal.

The nature of the polyimide foam makes it more compressible and lighter in weight as compared to other foams. This allows for quicker installation over comparable devices. The speed is beneficial across the board, but especially in tight spaces and/or places with radiation exposure. Utilizing the devices of the invention these plugs can lower radiation dosage for installers.

UL 94 is a flammability standard for polymer materials provided by Underwriters Laboratories. The standard classifies polymers according to how they burn in various orientations and part thicknesses in multiple classifications. The bodies of the invention formed comprising polyimide foam achieve a rating of UL 94 V-0, whereby burning stops within ten seconds on a vertical part, allowing for drops of plastic that are not in flames.

The thermal stability of the bodies of the invention is characterized as having a maximum continuous use temperature of at least 300° F. (149° C.), desirably at least 450° F. (232° C.), and preferably at least 500° F. (260° C.).

Thermal conductivity of the bodies of the invention at 75° C. (24° C.) is less than 5, desirably less than 3, and preferably less than 1 or 0.5 BTU-in/hr-ft$^2$-° F. as measured according to ASTM C518.

In a further important aspect of the invention, the body is formed of a unitary construction from a single piece of material which provides integrity to the foreign material exclusion device. Stated in another manner, in one embodiment of the invention, a one-piece body is enclosed within a single jacket. FIGS. 1 and 2 illustrate such an embodiment as only body 30 consisting of a single piece of foam is situated within jacket 20. Still further, it is important to note that no other components are located within the jacket other than the one-piece body.

In preferred embodiments, the device and body are free of a scaffold, frame, and internal support, and the like. Stated in another manner, no other component of the device extends into a part of the body in order to support or otherwise reinforce the body. The body being free of a scaffold, internal support, or the like is clearly evident from the cross-sectional view of FIG. 2. By providing the jacket with only one body therein, without any other components, provides a major benefit because there are no metallic, plastic or other hard or dense pieces or parts that could cause damage to moving parts, such as a turbine within a system in which the foreign material exclusion device 10 is utilized.

Jacket

As shown within the various figures of the invention, jacket 20 surrounds and encases body 30 therewithin. In a preferred embodiment only the body is present within the jacket. The jacket has an inner surface 21 and an outer surface 22. The jacket also has an upper face surface 23 and a lower face surface 24 located generally opposite each other. Upper face surface 23 is adjacent face 32 of body 30. Lower face 24 is adjacent lower face 34 of body 30. Depending on the construction of body 30, jacket 20 has one or more side walls 25.

Jacket 20 is formed from a durable material that is heat resistant so that the foreign material exclusion device can be used in high temperature environments. The material utilized to form the jacket 20 can be synthetic or natural or a combination thereof. The jacket can be woven or non-woven material and include one or more or two or more layers.

Materials utilized can be inherently flame-resistant materials, that are resistant to heat and flame due to their chemical structure. For example, materials in the form of fibers are available from Dupont as Kevlar® and Nomex® which comprise inherently heat and flame-resistant fibers and the actual structure of the fiber is not flammable. Thus, heat and flame protection is built into the fiber or material per se, which cannot be worn away or washed out and are thus preferred in one embodiment of the present invention. That said, heat or flame-resistant treated fabrics or materials can also be utilized. These materials are made heat and/or flame resistant by the application of a flame-retardant chemical or compound to the material in order to provide a desired level of flame retardancy.

Suitable heat resistant and fire-resistant materials are known in the art and available as Arselon®, Kevlar®, Modacrylic®, M5® fiber, Nomex® I, II and/or III, PBI® and Pyrovatex®.

In one embodiment, at least one layer of the jacket includes Nomex® 3 which is generally a blend of Nomex®, Kevlar® and one or more anti-static fibers.

In a further embodiment, the laminate is formed from a material that can be washed, for example one or more by hand and in a washing machine such as an industrial washing machine. Washing can be useful in order to remove debris, for example radiological debris.

In one embodiment, suitable materials for at least the jacket, and in some embodiments also the other components of the device, for example the body and handle are selected to have relatively low halogen content, for example below 1,000 ppm, below 500 ppm, and preferably below 350 ppm. Halogen-containing materials are commonly used for flame resistance but can penetrate protective, passivated coatings on stainless steels and induce corrosion. Thus, the use of low halogen-containing materials in the device of the present invention are desired when the device will be in contact with stainless steel components.

In a preferred embodiment of the invention, the jacket includes side wall seams 28 located at the junction where side wall 25 meets either upper face surface 23 or lower face surface 24 of the jacket. The side wall seams 28 are preferably sewn at about a 90° angle which provides desirable contact of the device with the walls of the construction such as a pipe or tube. Stated another manner, the upper face surface 23 or lower face surface 24 of the jacket are sewn substantially perpendicular to the side wall 25 of jacket 20. Providing the side wall seam 28 with an about 90° angle makes it easier for a user or installer to vacuum and/or otherwise remove debris from the top of the device before extraction.

The seams of the jacket 20 are sewn utilizing a high temperature resistant thread or yarn in preferred embodiments. The thread or yarn can be formed from any of the above-described materials or fibers that can be utilized to form the jacket. That said, the thermal stability of the jacket and the thread or yarn of the invention is characterized as having a maximum continuous use temperature of at least 300° F. (149° C.), desirably at least 450° F. (232° C.), and preferably at least 500° F. (260° C.).

In one embodiment, the jacket comprises an access port 26 located solely on the upper face surface 23 of jacket 20. The access port allows the body 30 to be inserted into and removed from the jacket 20 in certain embodiments. In other embodiments, the access port permanently sealed after the body is inserted into the jacket. Permanent sealing can be performed by heat sealing or stitching, or some other method.

Handle

One or more handles 40 are connected to upper face surface 23 of jacket 20. The number of handles utilized generally depends upon the overall dimensions of device 10. In a preferred embodiment, each handle 40 has a first end 42 and a second end 44, spaced from the first end. A grip 46 is formed between first end 42 and second end 44, with grip 46 not being connected or otherwise attached to the upper face 23 of jacket 20. Grip 46 can be manipulated by a user in order to insert and/or withdraw the device 10 from a construction.

In a preferred embodiment, the handle 40 is formed from the same material as jacket 20. In a preferred embodiment, the handle is formed of the same heat resistant material that the jacket is constructed from.

In a preferred embodiment, handle 40 is sewn to jacket 20. Further preferred embodiments, handle ends 42 and 44 can be adhered with an adhesive to the jacket 20.

Handle 40 is connected to jacket 20 such that a tether can be secured thereto in order to aid removing the device from the body.

Metal Free

In an important aspect of the present invention, device 10 is free of metal components. Accordingly, neither the jacket 20, body 30 or handle 40 include metal parts or components. Providing a device 10 that is metal-free prevents damage to systems or constructions in which the devices are installed.

Device Identifier

In an important aspect of the present invention, in one embodiment, the foreign material exclusion device includes a device identifier element that uniquely identifies a device utilized at a particular job site. The device identifier element can include identifying indicia such as one or more of numbers, letters and symbols. The device identifier element can include information such as, but not limited to, a part number, a temperature rating, manufacturer information, and a lot number.

Users of the foreign material exclusion devices, such as field technicians, are thus able to visually check the devices during use. Facile visibility of the device identifier element reduces technician exposure to high temperatures in some embodiments. Still further, in environments such as nuclear power plants providing a device identifier element allows reduced exposure to radiation, which is critically important.

In a preferred embodiment, the device identifier element is directly imprinted on one or more surfaces of the jacket, see FIG. 1 for example. In a preferred embodiment, the device identifier element is a laser marking. Thus, in a preferred embodiment the device identifier element is an integral part of the jacket. Importantly, no separate tag or label or the like is affixed to the jacket, which could be separated during use and be left in a construction.

In accordance with the patent statutes, the best mode and preferred embodiment have been set forth; the scope of the invention is not limited thereto, but rather by the scope of the attached claims.

What is claimed is:

1. A high temperature resistant foreign material exclusion device, comprising:

a body comprising a resilient foam, wherein the body is compressible and re-expandable in a direction parallel to at least one of a first face surface and a second face surface of the body, wherein a sidewall extends between the first face surface and the second face surface, wherein the body has a maximum continuous use temperature of at least 300° F. (149° C.);

a jacket that surrounds and fully encases the body within the jacket such that any debris contacting the foreign exclusion material device is not able to contact the body, wherein the jacket is flexible and conformable to a shape of the body but is a component separate and distinct from the body, wherein the jacket comprises a flame resistant material, wherein the jacket has a maximum continuous use temperature of at least 300° F. (149° C.); and a handle has a first end and a second end each directly connected to the jacket adjacent one of the faces of the body for manipulating the device.

2. The device according to claim 1, wherein the body and the jacket have a maximum continuous use temperature of at least 450° F. (232° C.).

3. The device according to claim 2, wherein the body has a maximum continuous use temperature of at least 500° F. (260° C.).

4. The device according to claim 2, wherein the body comprises open cell polyimide foam.

5. The device according to claim 4, wherein the body achieved a rating of UL 94 V-0 according to the UL 94 flame ability standard.

6. The device according to claim 5, wherein the body has a thermal conductivity at 75° C. of less than 5 as measured according to ASTM C518.

7. The device according to claim 6, wherein the body has a thermal conductivity at 75° C. of less than 1 as measured according to ASTM C518.

8. The device according to claim 7, wherein the jacket includes i) a first upper panel forms an upper face surface of the jacket and ii) a side wall, wherein the upper face surface and the side wall are sewn such that a side wall seam formed therebetween has an angle of about 90°.

9. The device according to claim 8, wherein the jacket includes i) a first lower panel forms a lower face surface of the jacket and ii) a side wall, wherein the lower face surface and the side wall are sewn such that a side wall seam formed therebetween has an angle of about 90°, wherein the seam is formed using a thread or yarn having a maximum continuous use temperature of at least 300° F. (149° C.), and wherein the body comprises open cell polyimide foam.

10. The device according to claim 2, wherein the device is free of each of a scaffold and an internal support within the jacket and body.

11. The device according to claim 2, wherein the jacket includes at least one seam that is permanently sealed with a thread or yarn having a maximum continuous use temperature of at least 300° F. (149° C.).

12. The device according to claim 2, wherein the handle and the jacket are formed from the same material.

13. The device according to claim 2, wherein the body is cylindrical, wherein the body is formed from a single piece of foam, wherein the handle has a first end connected to the jacket directly adjacent the first face surface of the body and a second end connected to a jacket directly adjacent the first face surface of the body, and wherein the first end and the second end are spaced from each other so they are not in contact.

14. The device according to claim 1, wherein the jacket includes i) a first upper panel forms an upper face surface of the jacket and ii) a side wall, wherein the upper face surface and the side wall are sewn such that a side wall seam formed therebetween has an angle of about 90°.

15. The device according to claim 1, wherein the device is free of metal components.

16. The device according to claim 1, wherein no other components are encased within the jacket besides the body, and wherein the body is a single piece of resilient foam.

17. A high temperature resistant foreign material exclusion device, comprising:

a body comprising a resilient foam, wherein the body is compressible and re-expandable in a direction parallel to at least one of a first face surface and a second face surface of the body, wherein a sidewall extends between the first face surface and the second face surface, wherein the body has a maximum continuous use temperature of at least 300° F. (149° C.);

a jacket that surrounds and fully encases the body within the jacket such that any debris contacting the foreign exclusion material device is not able to contact the body, wherein the jacket is flexible and conformable to a shape of the body, wherein the jacket comprises a flame resistant material, wherein the jacket has a maximum continuous use temperature of at least 300° F. (149° C.); and a handle directly connected to the jacket adjacent one of the faces of the body for manipulating the device, wherein the jacket includes i) a first lower panel forms a lower face surface of the jacket and ii) a side wall, and wherein the lower face surface and the side wall are sewn such that a side wall seam formed therebetween has an angle of about 90°.

18. A high temperature resistant foreign material exclusion device, comprising:

a body comprising a resilient foam, wherein the body is compressible and re-expandable in a direction parallel to at least one of a first face surface and a second face surface of the body, wherein a sidewall extends between the first face surface and the second face surface, wherein the body has a maximum continuous use temperature of at least 300° F. (149° C.), wherein the body comprises open cell polyimide foam;

a jacket that surrounds and fully encases the body within the jacket such that any debris contacting the foreign exclusion material device is not able to contact the body, wherein the jacket is flexible and conformable to a shape of the body, wherein the jacket comprises a flame resistant material, wherein the jacket has a maximum continuous use temperature of at least 300° F. (149° C.);

a handle directly connected to the jacket adjacent one of the faces of the body for manipulating the device;

a device identifier element inseparably affixed to the jacket, and wherein the device identifier element is a laser marking.

19. The device according to claim 18, wherein the body is cylindrical, wherein the body is formed from a single piece of foam, wherein the handle has a first end connected to the jacket directly adjacent the first face surface of the body and a second end connected to a jacket directly adjacent the first face surface of the body, and wherein the first end and the second end are spaced from each other so they are not in contact.

* * * * *